(12) United States Patent
Beehag

(10) Patent No.: US 7,676,298 B2
(45) Date of Patent: Mar. 9, 2010

(54) METHOD AND APPARATUS FOR SURFACE SHAPING OF POLYMER COMPOSITE COMPONENTS

(75) Inventor: Andrew Beehag, Glebe (AU)

(73) Assignee: CRC for Advanced Composite Structures Limited, Victoria (AU)

( * ) Notice: Subject to any disclaimer, the term of this patent is extended or adjusted under 35 U.S.C. 154(b) by 214 days.

(21) Appl. No.: 11/423,116

(22) Filed: Jun. 8, 2006

(65) Prior Publication Data
US 2006/0282192 A1 Dec. 14, 2006

(30) Foreign Application Priority Data
Jun. 8, 2005 (AU) .............................. 2005902980

(51) Int. Cl.
G06F 19/00 (2006.01)
(52) U.S. Cl. ....................... 700/207; 700/154; 700/155; 700/174; 700/192
(58) Field of Classification Search ................. 700/118, 700/119, 148, 154, 155, 164, 165, 174, 184, 700/186, 190–193, 206, 207, 212
See application file for complete search history.

(56) References Cited

U.S. PATENT DOCUMENTS

| | | | | |
|---|---|---|---|---|
| 3,592,030 | A * | 7/1971 | Smith, Jr. ...................... | 72/10.4 |
| 4,398,254 | A * | 8/1983 | Kondo et al. ................. | 700/155 |
| 4,858,139 | A * | 8/1989 | Wirtz .......................... | 700/196 |
| 5,221,351 | A | 6/1993 | Esser et al. .................. | 118/712 |
| 5,264,059 | A | 11/1993 | Jacaruso et al. | |
| 5,303,141 | A * | 4/1994 | Batchelder et al. ............ | 700/29 |
| 5,398,193 | A * | 3/1995 | deAngelis .................... | 700/119 |
| 5,738,817 | A * | 4/1998 | Danforth et al. ............. | 264/603 |
| 6,328,922 | B1 * | 12/2001 | Mishra et al. ................ | 264/322 |
| 6,815,636 | B2 * | 11/2004 | Chung et al. ............ | 219/121.65 |

(Continued)

FOREIGN PATENT DOCUMENTS

DE 4235824 A 2/1994

(Continued)

OTHER PUBLICATIONS

International-Type Search Report issued in related Australian Patent Application No. 2005902980 by the Australian Patent Office on Sep. 28, 2005 (3 pages.

*Primary Examiner*—Sean P Shechtman
(74) *Attorney, Agent, or Firm*—David A. Farah; Sheldon Mak Rose & Anderson PC

(57) ABSTRACT

A method of precision surface re-profiling of a composite polymeric component comprising a region capable of being re-profiled, comprising the steps of locating the polymeric composite component with a formable surface relative to a supporting fixture, the thickness of component comprising the formable surface being greater than the desired final thickness in a region to be re-profiled, moving a forming head into position into contact with the formable surface of the composite component with the aid of precision location or measurement sensors, causing the formable surface of the component to flow under the tool and creating a precisely defined local thickness or profile of component under the forming tool, and moving the forming head along the region of the component to be re-profiled, while maintaining the forming tool at a predetermined height profile or while leaving the re-profiled component with a predetermined thickness profile.

24 Claims, 3 Drawing Sheets

U.S. PATENT DOCUMENTS

| | | | |
|---|---|---|---|
| 2004/0170765 A1 | 9/2004 | Ederer et al. | 427/355 |
| 2005/0236379 A1* | 10/2005 | Nelson et al. | 219/121.69 |

FOREIGN PATENT DOCUMENTS

| | | |
|---|---|---|
| DE | 4235824 A1 | 2/1994 |
| EP | 0456111 B1 | 11/1991 |
| EP | 456111 B1 | 11/1991 |
| WO | WO01/19534 A | 3/2001 |
| WO | WO 01/19534 A | 3/2001 |
| WO | WO03/086726 A1 | 10/2003 |
| WO | WO 03/086726 A1 | 10/2003 |
| WO | PCT/AU02/01014 A1 | 12/2003 |
| WO | WO2005/025836 A1 | 3/2005 |

* cited by examiner

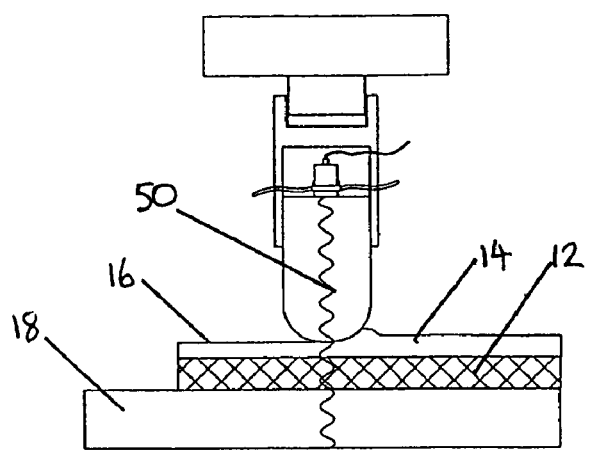
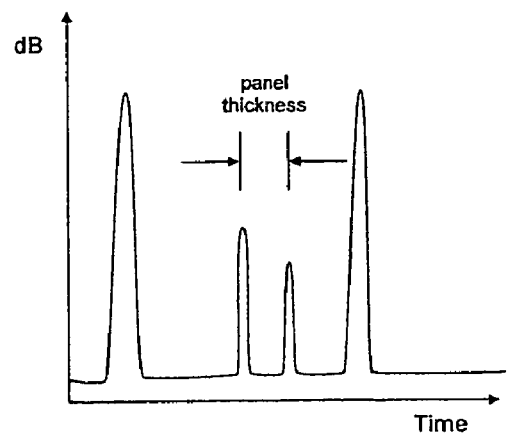
Figure 3A
Figure 3B
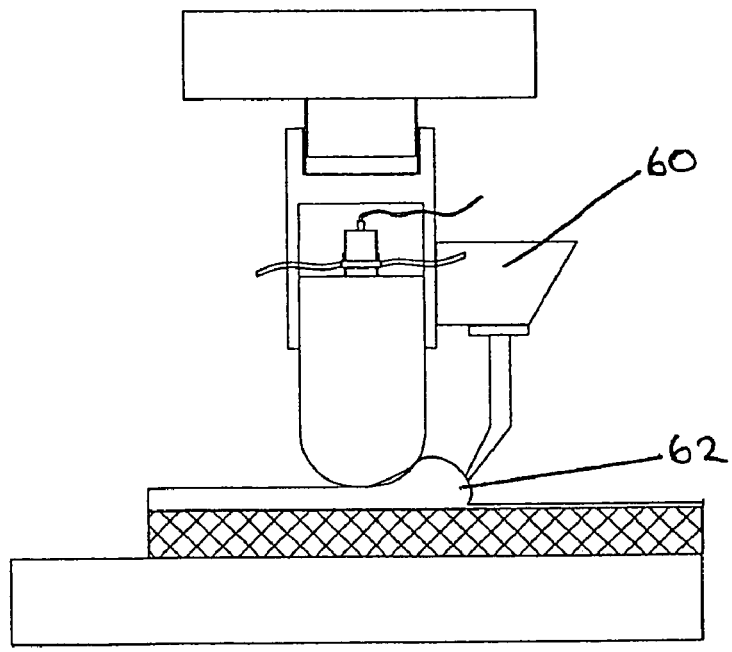
Figure 4

METHOD AND APPARATUS FOR SURFACE SHAPING OF POLYMER COMPOSITE COMPONENTS

CROSS-REFERENCE TO RELATED APPLICATIONS

The present Application claims the benefit of Australian Patent Application 2005902980, titled "Method And Apparatus For Surface Shaping Of Polymer Composite Components," filed Jun. 8, 2005; the contents of which are incorporated in this disclosure by reference in their entirety.

FIELD OF THE INVENTION

The present invention relates to polymer composite components. In particular, the invention relates to altering the surface profile or thickness of a thermoset polymer composite component. More particularly, the invention relates to a moving forming tool, a measurement system and a position actuator that shapes the surface profile of a composite component to a very high precision.

BACKGROUND OF THE INVENTION

Fiber reinforced polymer components, otherwise known as polymer composite components, consist of reinforcing fibers held together by a polymer resin, often known as the matrix. This matrix can be a thermosetting polymer such as an epoxy resin, in which case the composite component can be called a thermoset composite component, or a thermoplastic polymer such as polyamide or polyetheretherketone, in which case the component can be called a thermoplastic composite component. It should be noted that a thermoset composite component may contain small amounts of thermoplastic polymer, for instance as a surfacing film, a resin additive, or a binder agent. A thermoplastic composite component may in the same way contain small amounts of thermoset polymer, for instance in a core or insert.

Most large structural thermoset composite components such as carbon-epoxy components are made using open (one-sided) molds. A vacuum bag or other soft tooling surface is used to compact the reinforcing fibers and unreacted resin against the stiff mold. The whole assembly is then cured at elevated temperature. Due to variations in the thickness, or the weave structure of the reinforcements, or variations in the resin content, or variations in local temperature or pressure during the molding process, the surface quality or texture of the "bag-side" surface of the resulting parts may vary substantially. More importantly, the local thickness of the part may vary significantly, leading to variation in the surface contour of the laminate, especially in the bag-side surface. This causes the manufacturer to either accept loose tolerances for the dimensions of the assembled structure, or to incur considerable difficulty and increased expense in the assembly of such composite laminates with other components. Massive and stiff assembly jigs may be necessary to hold the components in position while shimming is carried out to compensate for the local irregularities of the surface contour of the components.

A process which could be used to produce or shape structural composite components, made using open molds, with accurate dimensions on any surface would be therefore be very desirable.

Current precision dimensioning processes include machining of the surface of laminates, where additional material is deliberately included in the original manufacture of the component and at least partly removed later in an additional machining process. Most machining processes involve micro-level fracture and frictional processes, and can generate significant amounts of heat. The heat generated can vary significantly within a short space of time, depending on the amount of material removed. This variable temperature can have an impact on the size of cutting tool and material under the tool, due to expansion that occurs with most materials upon application of heat, and therefore on the precision that can be achieved with a machining process. A second disadvantage with machining laminates to precise thicknesses is the difficulty in integrating a position sensor or thickness measurement system with a high speed moving component. Very high precision is generally achievable only when such sensors or measurement systems are used dynamically to control the position of the machining system, and locating the end of a high speed moving tool is difficult. It is more difficult still to pass a signal through a moving machining tool in order to effect precision measurements. Finally, if too much material is removed through the machining process, repair of the component involves a lengthy and expensive process of adding additional material, and in some cases the component is simply scrapped.

In some instances, particularly where the tolerance requirements for assembly are, for example, better than 50 µm, machining of surfaces may not be accurate enough for this requirement, and in practical terms such precision requirements are often met by using expensive and time-consuming shimming processes such as those outlined above.

The applicant has recently developed a process for shaping of thermoplastic surfaces on thermosetting composite laminates. This process is described in applicant's PCT application PCT WO 2005/025836 A1, the contents of which are incorporated herein by reference. This process has the key advantage that precision surface dimensions can be achieved on a thermosetting composite material following manufacture, either by using a quasi-static tool press or a moving tool. In the instance of a quasi-static tool used to create a precision component thickness, the thermoplastic surface is heated and the aforementioned tool pressed into the thermoplastic surface, imprinting it and allowing creation of a localized area of defined thickness. The accuracy of thickness is thus determined the accuracy of the tool, by the stiffness of the tool and pressure application system, the accuracy of tool stops or other means of preventing excessive impression of the tool, and the accuracy with which the thermosetting component is held down during this process. An additional limitation of the process utilizing a quasi-static tool is the questionable scalability of the process, as the achievable accuracy of the process may decrease with increasing tool size. The aforementioned recently developed process also includes the use of moving forming tools. These tools allow the scalable application of the process, however this technique is likely to have low levels of precision. In either case, achieving a surface profile accuracy greater than 100 µm for a practical component is unlikely.

Therefore, in order to utilize the invention described in PCT WO 2005/025836 A1 more fully and to achieve very high precision over large surface areas, it is necessary to improve the stated process. Furthermore, by providing an improved process and apparatus for surface re-profiling, the principle of providing a high accuracy surface can be extended beyond thermosetting composites with thermoplastic surfaces.

SUMMARY OF THE INVENTION

Broadly, the present invention involves a method for forming a surface on a polymer composite component giving that component a specific component thickness and surface shape, measured and controlled to a high level of precision.

The present invention provides a method and apparatus for the formation of localized precision surfaces on polymer composite materials. In accordance with the method of the invention, the component which is to have its surface re-profiled is precisely located in a supporting tool or equivalent fixture. A forming tool, which may be located for example on the end of a multiple axis robotic arm, is precisely located by means of one or more incorporated precision location or measurement systems, some of which systems may be attached directly to the forming tool. The forming tool is then moved relative to the component, with the position of the forming tool being precisely monitored and controlled by means of the incorporated placement and/or measurement systems.

In one embodiment of the invention, the polymer composite itself has a surface that can be reshaped using the forming tool, and has sufficient attached material to allow reshaping of the surface without the addition of new material. In another embodiment of the invention, additional surfacing material is placed on the component surface during the movement of the forming tool.

An advantage of this improved process is the ability to generate a surface by very precise movement of the forming tool, giving final component dimension precision that may not be feasible by other methods in the current art.

An additional advantage of this improved process is that location precision of the actuation device does not greatly influence the final precision of the forming tool, as the position of the forming tool is directly measured and controlled using one or more additional precision measurement and control systems. In some instances, the location of the end of the forming tool itself is not directly measured, and the thickness of the component is instead directly measured under the forming tool, providing greater accuracy of placement. The re-profiled surface of the present invention preferably has an accuracy of less than ±200 μM, more preferably ±200 μm, and even more preferably less than ±50 μm.

An additional advantage is the thermal predictability of the system, meaning that imprecision due to thermal expansion of tools and/or components is minimal, due to the simplicity and comparative thermal consistency of the process.

An additional advantage is that the precision surface may be generated using different surface or surfacing materials, the process and apparatus being suited to the use of heat setting materials, and to the use of heat softening or heat melting materials.

An additional advantage is the ability to reprocess the precision surface simply and inexpensively by reapplying the process, particularly when the process is applied to a composite component with a heat softening or heat melting material attached to the surface.

Preferably, the composite component includes largely of a thermoset polymer composite material, with a thermoplastic polymer layer on at least the part of the surface to be re-profiled. While the thermoplastic polymer layer may be attached subsequent to curing of the thermoset polymer composite component, the thermoplastic polymer surface layer is preferably integrated by collocating a thermoplastic polymer with an uncured thermosetting polymer composite before the thermosetting polymer cures, such that the thermoplastic polymer and the thermosetting polymer at least partially interpenetrate. One method of providing a thermoset polymer component with a partially interpenetrating thermoplastic polymer surface layer is the subject of International Patent Application No. PCT/AU02/01014, the contents of which are incorporated herein by reference.

According to a first embodiment of the invention, there is provided a process of precision surface re-profiling of a component comprising a region to be re-profiled comprising the steps of:

locating the composite component with a formable surface in a supporting fixture, the thickness of composite component comprising the formable surface being greater than the desired final thickness in the region to be re-profiled;

moving a forming tool into contact with the formable surface of the composite component with the aid of precision location or measurement sensors, causing the formable surface of the component to flow under the tool and creating a precisely defined local thickness or profile of component under the forming tool; and moving the forming tool along the region of the component to be re-profiled, while maintaining the forming tool at a precise predetermined height profile with the use of precision location or measurement sensors to form the re-profiled surface.

In a preferred form of the invention, the forming tool is maintained at the precise predetermined height profile with the use of a precision actuator or actuators controlled by feed back from precision location or measurement sensors.

The formable surface on the composite may be a heat softening or heat melting material such as a thermoplastic polymer, such that heating the thermoplastic surface to a sufficiently high temperature will allow the thermoplastic to flow, and subsequent cooling of the thermoplastic will cause solidification. Alternatively, the formable surface may be a heat setting material such as an uncured thermosetting polymer, which is formable prior to curing of the polymer, but following chemical reaction of the polymer becomes solid.

In another aspect of this embodiment, there is provided:

an apparatus for precision surface re-profiling of a region of a component, the region comprising a formable surface for re-profiling, the apparatus comprising a forming tool for moving along the region to be re-profiled, the forming tool comprising means to cause the formable surface to flow under the tool;

an actuation system to position and move the forming tool, and a controller for receiving signals from location or measurement sensors to move and position the forming tool in a predetermined path or so as to leave the re-profiled component with a predetermined thickness profile.

In a preferred form of this aspect of the invention, the forming tool is maintained at the precise predetermined height profile with the use of a precision actuator or actuators controlled by feed back from precision location or measurement sensors.

According to a second embodiment of the invention, there is provided a process of precision surface re-profiling a region of a composite component comprising the steps of:

locating the composite component relative to a supporting fixture, the thickness of composite component and any attached surface material being less than the desired final thickness in the region to be re-profiled;

moving a forming tool into position above or adjacent to the surface of the composite component to be re-profiled;

adding a formable material underneath and/or in the path of the forming tool;

adjusting the position of the forming tool with the aid of precision location or measurement sensors, such that the formable material and component underneath the forming tool creates a defined local thickness or profile;

moving the forming tool along the region of the component to be re-profiled, while simultaneously adding sufficient formable material underneath and/or in the path of the forming tool to create a modified surface and maintaining the forming tool at a precise height profile using the precision location or measurement sensors.

According to this embodiment of the invention, the forming tool is preferably maintained at the precise predetermined height profile with the use of a precision actuator or actuators controlled by feed back from precision location or measurement sensors.

In another aspect of the second embodiment, there is provided:

an apparatus for precision surface re-profiling of a region of a composite component, the apparatus comprising:

a forming tool for moving along the region to be re-profiled;

a material feed system for adding formable material underneath and/or in the path of the forming tool to provide a modified surface in the region of the component, an actuation system to position and move the forming tool, and a controller for receiving signals from location or measurement sensors to move and position the forming tool in a predetermined path or so as to leave the re-profiled component with a predetermined thickness profile.

In a preferred form of this aspect of the invention, the forming tool is positioned so as to leave the re-profiled component with a predetermined thickness profile with the use of a precision actuator or actuators controlled by feed back from precision location or measurement sensors.

The forming tool may be constructed so that the forming surface moves relative to the body of the forming tool.

For instances where the component surface is re-profiled by use of a heat softening or heat melting material, a part of the process may include the heating and/or cooling of the heat softening or heat melting material. Heating of the heat softening or heat melting material is necessary for such forming operations as described in the first or second embodiment of the invention. Examples of suitable heating systems include infrared lamps, lasers, hot-air guns and ovens. Additionally, cooling of the heat softening or heat melting material may be undertaken after forming, such cooling preventing unwanted changes in the heat softening or heat melting surface due to further flow of the surface material, e.g. under gravity. This may be achieved, for example, through the use of cold air blown across the heat softening or heat melting surface. The first and second embodiments of the invention take advantage of the fact that the heat softening or heat melting material can be made to flow at elevated temperature and, upon cooling, resolidified. Additionally or alternatively, the shaped tool may have an integrated system of heating or cooling. In the case of a heat softening or heat melting material, the forming tool may be heated above the temperature at which the surface material can be made to flow, such that pressing the shaped tool against the surface layer simultaneously heats the surface layer above the temperature at which it can be made to flow. The method may further include cooling at least part of the forming tool in contact with the re-profiled composite component such that the heat softening or heat melting material is cooled to below the temperature at which it can be made to flow easily, preventing unwanted changes in the heat softening or heat melting surface subsequent to removal of the tool from contact with the surface layer. As an alternative, the step of heating the heat softening or heat melting surface layer may be undertaken locally prior to contact with the shaped tool. In this instance the tool may not be heated, or may be heated to a temperature below the flow-temperature of the surface material, thus removing the need for a cooling step. This heating system may be attached to the moving forming tool, for example a hot air gun or infrared lamp, such that the material immediately before the forming tool is heated. In addition, independent of the forming tool, a cooling system may be added to reduce the temperature of the surface material behind the moving forming tool as a part of the re-profiling process.

The cooling and/or heating of the surface material may be performed prior to, during or after the re-profiling process.

In the case of additional thermoplastic surfacing material being added during the process as described in the second embodiment of the invention, the thermosetting component preferably has some thermoplastic material already attached strongly on its surface. More preferably, this thermoplastic material is attached to the thermosetting composite by means of a semi-interpenetrating polymer network, such as described in PCT/AU02/01014.

Where additional material is added at the time of re-profiling, this material is preferably at least partially comprised of a polymer and may be, after heating if necessary, a high-viscosity liquid or paste, and be extruded onto the surface of the composite component ahead of the forming tool, or into the gap between the component and re-profiling tool. Alternatively, the additional material may be in the form of a reformable solid or semi-solid strip or film or sheet or filament, fed into the gap between the forming tool and the component by any number of existing mechanical feed mechanisms. The additional material may contain fillers or reinforcement to control flow behavior or mechanical properties.

Where re-profiling is carried out using a heat setting material, heat may be added as a part of the process in the first or second embodiments of the invention to improve processibility of the heat setting material prior to or during contact with the forming tool. Furthermore the temperature of the heat setting material may be increased during or after contact with the forming tool in order to assist the chemical reaction of the heat setting material. Heating external to the tool may be used for this purpose, for instance by use of infrared heat (e.g., infrared lamps) or an oven (e.g., hot air). Additionally or alternatively the tool may be heated to a temperature at which processibility improves and/or chemical reaction initiates, causing to some degree solidification of the heat setting material. Additionally or alternatively, a heating system may be attached behind the forming tool, causing chemical reaction and solidification of the profiled surface. As a part of the profiling process, where a heat setting material has been profiled using a moving forming tool, the component or locally profiled surface may be heated following the completion of the profiling stage in order to effect solidification of the heat setting material, for example by placing the component in an oven following the re-profiling stage.

The forming tool that forms a part of the apparatus of the invention may be made at least partly of a material that can easily transfer heat to the polymer surface, such as a polished steel or aluminum. The tool may also be finished or surfaced so that it can easily release from the surface material. An additional part of the above process may include preparing the surface of the shaped tool with a release agent or other substance to aid in removing the tool from the formed surface. The shape of the tool may be optimized for creating the highest surface quality. Furthermore the shaped tool may include some features that reduce levels of relative movement between the forming tool and the surface material that is being re-profiled. Examples of such features include the use of a roller, or a continuous foil that is moved with the forming tool.

The first or second embodiments of the invention may include the use of an additional material between the forming tool and the surface to be re-profiled. Preferably, this material would be a flexible material able to withstand high temperature and release easily from the re-profiled surface, for example a polyimide film. Use of heating or cooling to alter the behavior of a heat setting, heat softening or heat melting material may be conducted where necessary through this additional material.

The process of re-profiling the surface of a particular component may utilize both the first and second embodiments of the invention. For example a component that has a formable surface that is in most places thicker than the dimension ultimately required following processing may, however, in specific areas, require the addition of surfacing material.

The re-profiling process may involve the use of one or more types of location or measurement sensor. In a preferred embodiment of the invention, an ultrasonic sensor is coupled to the forming tool, such that an ultrasound signal is sent directly through the component, and a direct measurement of component thickness is obtained. Thickness measurement using eddy currents or magnetic fields or measurement by triangulation of multiple position sensors are some of the available alternative systems. The thickness measurement sensor preferably utilizes, generates and/or senses laser light, ultrasonic signals, eddy currents, or magnetic fields.

The process at its most basic level involves the relative movement of a re-profiling tool and a component to be re-profiled. In most instances it will be more effective to keep the component fixed in space while the re-profiling tool is moved. However the invention includes alternatively or additionally moving the component in space as part of the process.

The process for precision surface forming may include minute adjustments of height, such that the apparatus for precision forming may include a high precision position actuator positioned between the actuator system and the forming tool, which is controlled with the assistance of information received from one or more location or measurement sensors.

The required dynamic position of the forming tool may be determined directly from information from location and/or measurement sensors, or may be determined using a more sophisticated process taking into account predictive models which consider the physical properties of the constituent materials, thermal profile of the apparatus, surface and component, or other relevant factors. The required thickness profile of each component may be individually adjusted according to a predetermined geometry derived by mapping the profile of interfacing components, and the trajectory of the forming tool adjusted accordingly.

The apparatus for surface forming may also include additional sensors, comprising load measuring sensors, thermocouples, and other sensors relevant to monitoring and/or improving processing.

The scope of the present invention extends to composite components with surface profile produced according the previously described method or from the previously described apparatus.

The aforementioned "thermoplastic polymer" may refer to a pure thermoplastic polymer, a copolymer or a polymer blend. The thermoplastic polymer may further comprise some percentage of filler, fiber or other material within the thermoplastic material. Additionally, the aforementioned "thermosetting polymer" may refer to an uncured thermosetting polymer that may further comprise some percentage of filler, fiber or other material within the thermosetting material.

The invention in another aspect includes a composite component comprising a re-profiled surface formed by the method described above.

BRIEF DESCRIPTION OF THE DRAWINGS

FIG. 3A is a schematic of a precision re-profiling apparatus, incorporating a thickness measurement sensor;

FIG. 3B is a schematic of the output from an ultrasonic thickness measurement sensor, illustrating direct measurement of component thickness using this technique;

FIG. 4 is a schematic view of the re-profiling process in accordance with the second embodiment of the invention.

DETAILED DESCRIPTION OF THE EMBODIMENTS

Figure 1:
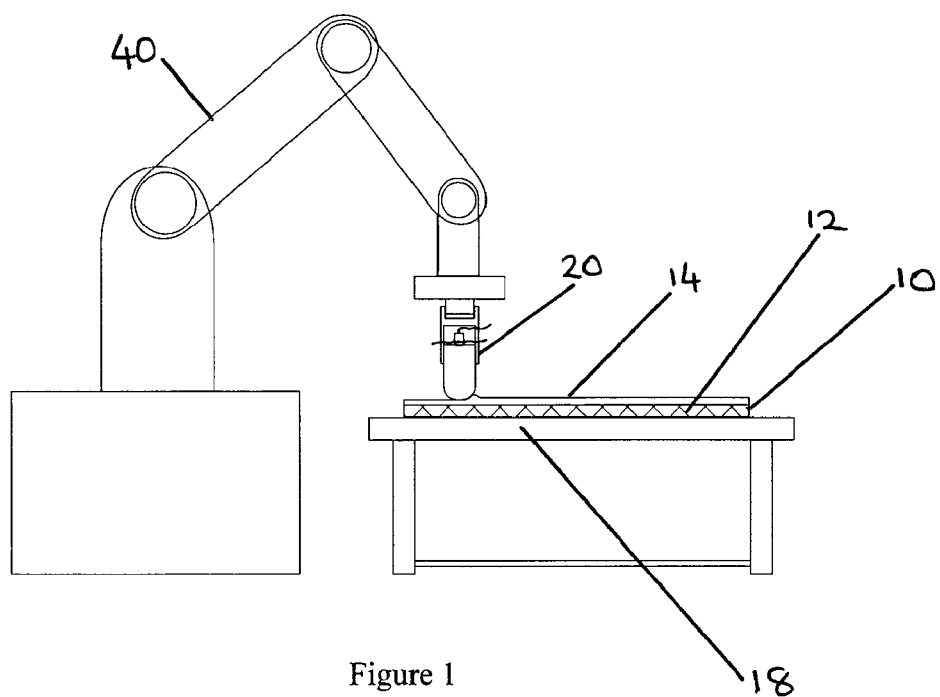
FIG. 1 is schematic view of a re-profiling system and process in accordance with the first embodiment of the invention.
Figure 2:
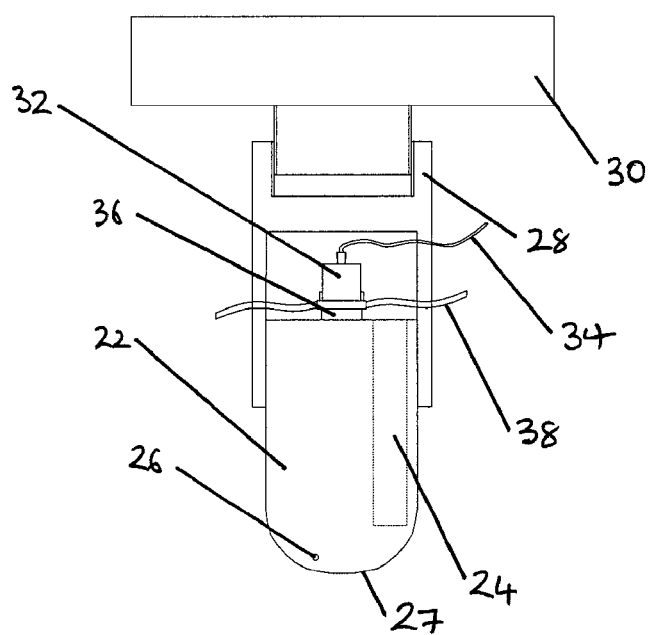
FIG. 2 is a cross-sectional view of a precision re-profiling apparatus in accordance with the first embodiment of the invention.

The method according to the invention is suitable for use with polymer composite components 10, such as that shown in FIG. 1, with a substrate 12 made up of a thermoset composite, and a formable surface layer 14 attached to the substrate 12. The component 10 is located on a supporting fixture 18. The re-profiling apparatus 20 is attached to an actuation system 40 such as a 6-axis robot or gantry to control the relative displacement of the forming tool with respect to the supporting fixture 18. A detailed schematic of the re-profiling apparatus 20 is shown in FIG. 2. In a preferred embodiment of the first embodiment of the invention, the apparatus consists of a re-profiling tool 22, enclosed within which is a heater element 24, and a cavity or cavities 26 for locating a temperature control thermocouple. The re-profiling tool 22 may consist of a metal such as steel or aluminum, and the re-profiling surface 27 that is in contact with the formable surface may be coated or highly polished in order to provide the surface finish and accuracy required for a high precision re-profiling process. The re-profiling tool 22 is secured and thermally insulated from surrounding material through use of a cradle 28, which attaches to a precision actuator 30. The precision actuator 30 provides a means of making fine, micron-level adjustments of the re-profiling tool 22. The position of the precision actuator 30 is controlled directly by a control system which takes information from measurement systems, the output of which is compared to the desired thickness of the component and the precision actuator 30 adjusted accordingly. The measurement system can take the form of a thickness sensor 32, where the output of the thickness sensor 34 is linked to the control system for operating the precision actuator 30. Where the thickness sensor 32 is sensitive to temperature, a cooled isolator 36 may be located between the thickness sensor 32 and the re-profiling tool 22. This isolator can then be attached to water cooling 38. A schematic of the operation of a sensor measurement is shown diagrammatically in FIG. 3A. The thickness sensor 32 operates by sending a high frequency pulsed signal 50 through the cooled isolator 36, and re-profiling tool 22. The signal will continue to travel through the composite component 10 and supporting fixture 18. Separate portions of the signal will be reflected from the re-profiling surface 27 and the lower surface of the composite component 10, and will travel back to the thickness sensor 32 arriving at different times, shown schematically in FIG. 3B. The difference in time taken for the high frequency signal 50 to return to the thickness sensor 32 can be used to determine the thickness of the component 10 between the re-profiling surface 27 and supporting fixture 18. In some embodiments of the present invention the support fixture may include a floor or the ground. The placement of the thickness sensor 32 should be directly above the re-profiling surface 27, so that a precise measurement of thickness under the re-profiling surface 27 can be taken, and as much as possible other inclusions such as the heater element 24 should not obstruct this path.

When processing strictly according to the first embodiment, the thickness of the formable surface layer 14 ahead of the re-profiling apparatus 20 is greater than the final desired thickness. The temperature of the re-profiling tool 22 or the surrounding material may at this time be altered to provide suitable conditions for flow of the surface material 14. When the surface material 14 underneath and ahead of the re-profiling tool 22 is able to flow, the re-profiling apparatus 20 is moved by the multi-axis actuator 40 to continuously shape the formable surface 14, and ahead of or underneath the re-profiling tool the temperature of the surface material 14 is also altered to enable ongoing uninterrupted movement of the re-profiling apparatus 20. Simultaneous with the movement of the re-profiling apparatus 20 by the multi-axis actuator 40, the thickness of the component 10 is measured by means of a thickness sensor 32. The thickness sensor 32 is preferably is attached to or contained within the forming tool 22. The position of the multi-axis actuator will generally be determined through geometrical models of the component 10, and position encoders or other measurement devices that are normally found with a multi-axis actuator 40. However, additional sensors may be used to adjust or increase the accuracy of the multi-axis actuator 40. The output 34 from the thickness sensor 32 may be used directly to alter the position of the multi-axis actuator 40 and/or a precision actuator 30 attached to the surface re-profiler 20. Additionally, theoretical models of the progression of the signal 50 through different materials in solid and molten state may be used to determine the optimum adjustment of the multi-axis actuator 40 and/or precision actuator 30. Models may also be developed to determine the difference in final dimension of a component 10 from the dimension measured during processing, due to such physical processes as shrinking as a result of temperature decrease in order to determine the optimum adjustment of the position of the multi-axis actuator 40 and/or precision actuator 30. Where a heat setting material is used as the formable surface 14, models of the degree of heat setting and level of flow with heat may be included to improve the final precision of the process.

The result of the above described movement of the re-profiling tool 22 to re-profile the surface material 14 is a precision re-profiled surface 16. In a preferred embodiment the formable surface layer 14 is a thermoplastic material. More preferably the thermoplastic layer is attached to the underlying material 12 by means of a semi-interpenetrating polymer network, such as that described in PCT/AU02/01014. In the configuration of apparatus shown in FIG. 1 and FIG. 2, an internal heater 24 is used to bring the forming tool 22 to a temperature above the softening or melt temperature of the thermoplastic 14, so that the thermoplastic flows ahead of and around the forming tool 22. An internal heater 24 is only one of several means that may be used to raise the temperature of the surface material 14, and the depiction of an internal heater 24 in no way restricts the process of surface material 14 temperature raising to heating by contact with the profiling tool 22. The heat softening or heat melting surface 14, comprising been brought to a temperature at which flow can occur and then re-profiled, is allowed to cool and resolidify. A further modification to the apparatus is the addition of a facility to aid in the cooling of the surface material 14.

The formable surface material 14 may alternatively be a heat setting material, such as a thermosetting epoxy paste. In the case of using such a paste, the process may include specific surface preparation to improve the adhesion between the thermosetting paste and the substrate material 12. Heating of the re-profiling tool 22 in this instance will aid in increasing the level of flow initially, and up to a critical temperature where curing of the thermosetting adhesive will initiate. Following initiation of the curing, the viscosity of the thermosetting paste will gradually increase. It is important that re-profiling does not occur without some level of curing, as this may lead to distortion of the re-profiled surface when curing is eventually undertaken. Therefore the re-profiling stage of a thermosetting resin will require that some level of curing is undertaken during the profiling process. Subsequent to the re-profiling process, an increasing degree of curing can be achieved by a process of postcuring, a technique which is well known to those skilled in the art.

When processing strictly according to the second embodiment, the thickness of the formable surface layer 14 ahead of the re-profiling apparatus 20 is less than the final desired thickness. A schematic of the component 12 undergoing the re-profiling process is presented in FIG. 4. In the initial part of the surface to be re-profiled, additional formable surface material 62 must be placed underneath the re-profiling tool 22 prior to moving the re-profiling tool 22 to the desired re-profiling height. With the use of a thickness sensor 32 that relies on material contact to pass through a high frequency pulsed signal 50 to obtain a thickness measurement, a measurement of high precision cannot be made until the formable surface material has been placed under the profiling tool 22. Subsequent to this, the multi-axis actuator 40 is used to move the re-profiling apparatus 20 across the region to be re-profiled, while simultaneously additional surfacing material 62 is added ahead of the re-profiling tool 22 by the material feed system 60. Also simultaneously, the position of re-profiling tool 22 is adjusted through the use of a sensor 32 and precision actuator 30 in the same manner as for the apparatus used for the first embodiment of the invention. Where the additional surfacing material 62 is a heat softening or heat melting material such as a thermoplastic polymer, the level of attachment of the re-profiled surface 16 to the underlying substrate material 12 may be improved if the substrate material has at least a thin layer of the same material already attached to the substrate 12. Such a means of attachment is the creation of a semi-interpenetrating polymer network between the thermoplastic and thermosetting material of the underlying substrate material 12, such as that described in PCT/AU02/01014. Heating may be used to bring the forming tool 22 to a temperature above the softening or melt temperature of the thermoplastic 14, so that the thermoplastic flows ahead of and around the forming tool 22, in a manner identical to the apparatus used for the first embodiment of the invention. Additionally, sufficient heating must be incorporated into the material feed system 60 to enable flow of the heat softening or heat melting material 62 that is placed ahead of the re-profiling tool 22. Subsequent to forming the re-profiled surface the heat softening or heat melting surface 14 is allowed to cool and resolidify. A further modification to the apparatus is the addition of a facility to aid in the cooling of the surface material 14.

Where the additional surfacing material 62 is a heat setting material such as a thermosetting polymer, some surface preparation of the underlying substrate 12 may be necessary prior to application. Furthermore, some heating can be incorporated into the material feed system 60 in order to reduce the viscosity of the heat setting material. Additional heating is preferably applied through the re-profiling tool in order to provide some level of curing of the heat setting material.

The traverse speed of the re-profiling apparatus 20 is partially dependent on the shear rate of the formable surface material 14, the viscosity of the formable surface material 14, and the profile of the re-profiling tool 22. Using a traverse speed that is too high can result in undesirable surface roughness of the re-profiled surface. In this instance, a sacrificial material such as a polyimide film may be used between the profiling tool surface 27 and the formable surface material 14. In this case, the shearing of the surface material 14 is considerably reduced, which may result in greatly improved surface quality with increased traverse speeds. When utilizing such a sacrificial material, the signal 34 emanating from the sensor 32 can be adjusted to account for the thickness of the sacrificial material, where the thickness of the component 20 under the re-profiling tool 22 cannot be distinguished from the sacrificial material.

It is noted that the apparatus shown schematically in FIG. 4, ostensibly to be used for the second embodiment of the invention, can be used for the first embodiment of the invention where necessary, being capable of being used for the forming of excess surface material 14 on the surface of a composite component 12. Likewise where the first embodiment of the invention is being utilized, and a region to be re-profiled has insufficient material, material may be added ahead of the re-profiling tool 22 using the material dispenser 60 or by any other means according to the method and apparatus of the second embodiment of the invention.

It will be understood by those skilled in the art that the use of either the first or second embodiment of the invention on a composite component with a formable surface can result in the formation of a local surface area with very high thickness precision. In particular, the precision of the process is essentially governed by the level of accuracy achievable by the precision actuator 30, and the resolution of the measurement sensor 32.

Figure 5:
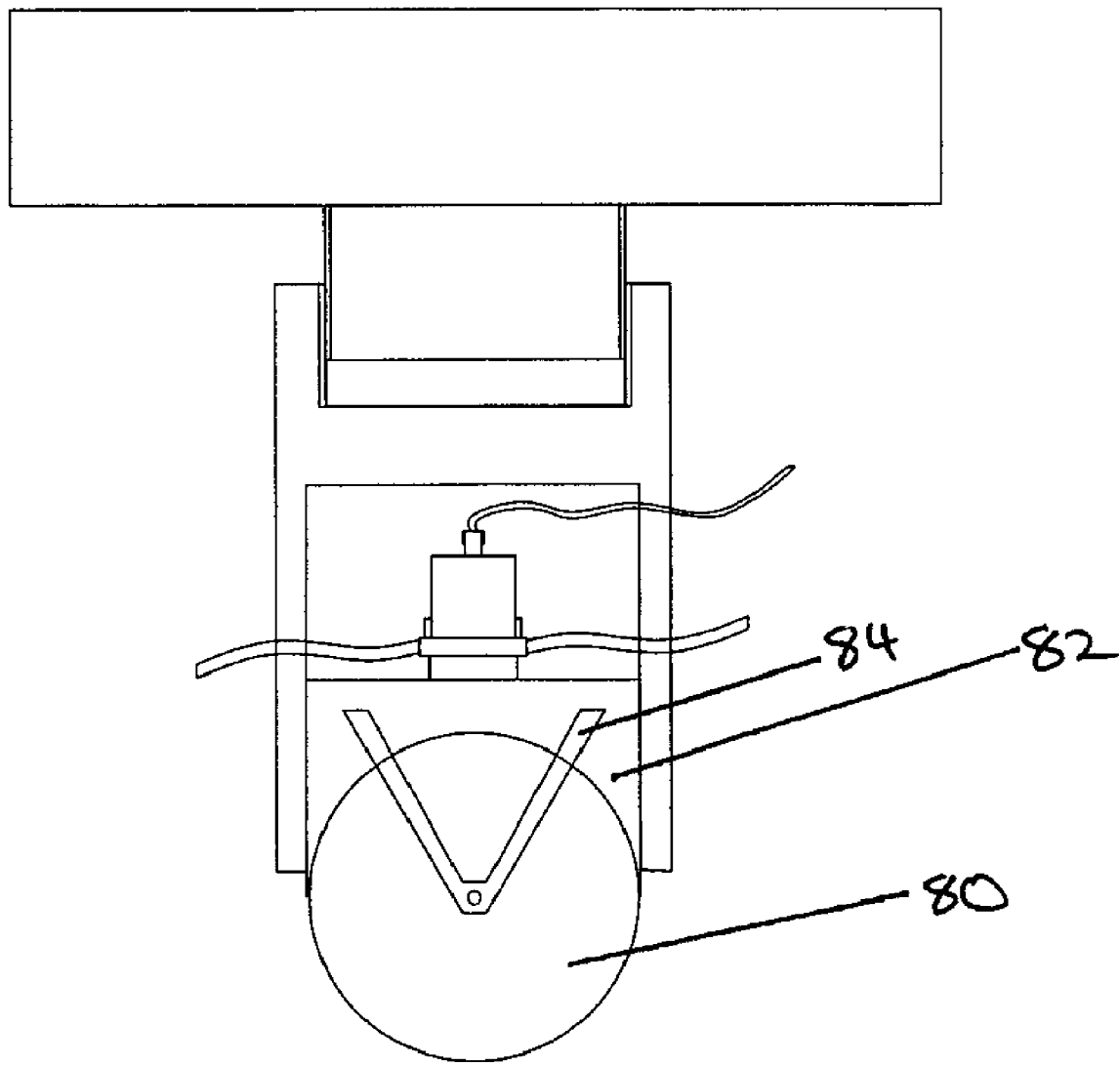
FIG. 5 is a schematic view of an alternative re-profiling apparatus in accordance with the first embodiment of the invention.

The apparatus shown in FIGS. 1 to 4 is one example of a re-profiling apparatus 20 that may be used for the re-profiling process. As well as heating 24, thermal insulation of some parts of the apparatus 20 may be included, preferably between the re-profiling tool 22 and cradle 28. Additionally, an alternative configuration for the profiling apparatus may include a roller 80, such as shown in FIG. 5. In this case the thickness measurement sensor 32 and any cooling system 36 can be attached to a stationary block 82. The stationary block 82 may be made of a suitably heat resistant but moderately compliant material, such as PEEK. For the type of thickness sensor 32 shown in FIG. 5, it is important that an appropriately designed fixing arm 84 is used to maintain close physical contact between the roller 80 and stationary block 82, in order that the high frequency pulsed signal 50 can pass uninterrupted through the stationary block 82 and roller 84, and then through the component 10. It will be understood by those skilled in the art that, with modification to include a material feed system 60 such as that shown in FIG. 4, that the apparatus shown in FIG. 5 may also be used to perform processes according to the second embodiment of the invention.

Furthermore the apparatus shown in FIG. 1 displays a multi-axis actuator 40 that performs large-scale movements, and a supporting fixture 18 that is fixed in space. This particular configuration of apparatus may limit the size of component that may be re-profiled, although the invention in no way limits the size of component that may be re-profiled. For instance the fixture 18 may be replaced with a conveyor belt arrangement, and may with sufficiently accurate thickness measurement systems be employed with minimal loss of thickness tolerance in the process.

The first and second embodiments of the invention are particularly useful with thermoset composite components 10 with a compatible thermoplastic polymer surface layer 14, e.g. a layer of polyvinylidene fluoride (PVDF), either pure PVDF or containing the PVDF in combination with other polymers and/or conventional additives, with an epoxy composite substrate. Such a thermoplastic polymer layer 14 is preferably collocated prior to, or during, curing of the thermosetting resin of the substrate 12. Processed in this manner, the thermoplastic polymer layer and thermosetting resin substrate 12 may interpenetrate to enhance the bonding between them. This processing method is disclosed in co-pending International Patent Application PCT/AU02/01014. However, other methods of attaching a thermoplastic surface to a thermosetting polymer may also be used, for example a method which involves the use of embedded fibers across the thermosetting/thermoplastic polymer interface as described in U.S. Pat. No. 5,264,059 by Jacaruso et al.

Reference to any prior art in the specification is not, and should not, be taken as an acknowledgement or any form of suggestion that this prior art forms part of the common general knowledge in Australia or any other country Experimental Discussion A stack of 20 plies of Hexcel plain-weave carbon fiber/F593-18 epoxy prepreg was placed on a flat aluminum mold, to give a composite panel thickness of approximately 4.6 mm. Onto this stack was placed a 1.2 mm thickness of PVDF thermoplastic polymer. The stack was enclosed within a vacuum bag, and the air within the bag evacuated. The stack was cured for 2 hours at 177° C., under 0.63 MPa external pressure. This process resulted in a cured thermoset composite laminate with an attached thermoplastic polymer surface. The cured laminate was located on the motorized table of an overhead milling machine. Attached to the machine was a heated shaped tool, which was adjusted to a height of approximately 5 mm above the motorized table, and maintained at a temperature of 220° C. The hot tool was then moved through the upper part of the thermoplastic layer, causing the thermoplastic material to flow and move ahead of the heated shaped tool. The remaining surface was precisely profiled to a set height. Additionally, a 10 MHz ultrasonic sensor was coupled to the upper surface of the shaped tool, and an ultrasonic signal passed through the tool, thermoplastic layer and composite panel. The reflection times of the signal from the lower surface of the shaped tool and the lower surface of the composite panel could be detected, and were translated into a panel thickness. The estimated resolution of thickness detection from the trial was between 20 and 30 microns.

Although the present invention has been discussed in considerable detail with reference to certain preferred embodiments, other embodiments are possible. Therefore, the scope of the appended claims should not be limited to the description of preferred embodiments contained in this disclosure. All references cited herein are incorporated by reference in their entirety.

The invention claimed is:

1. A method of surface re-profiling of the surface of a polymeric composite component comprising a formable surface with a region to be re-profiled to a predetermined local height with an accuracy of +/−200 microns, comprising the steps of:
   a) locating the polymeric composite component with a formable surface in a fixed position on a supporting fixture during re-profiling, the thickness of composite component comprising the formable surface being greater than a predetermined final thickness in the region to be re-profiled;
   b) moving a heatable forming tool into position into contact with the formable surface of the composite component with the aid of location or measurement sensors, heating the formable surface of the composite component during contact with the forming tool and causing the formable surface of the component to flow under the tool and creating a defined local thickness or profile of the component under the forming tool as the tool moves across the region to be re-profiled on the formable surface; and
   c) moving the forming tool with the use of location or measurement sensors along the region of the component to be re-profiled, while maintaining the forming tool at a predetermined height profile or while leaving the re-profiled component with a predetermined thickness profile, to form a re-profiled surface.

2. The method according to claim 1, where the formable surface comprises a heat-setting material.

3. The method according to claim 1, where the formable surface comprises a heat-softening material or a heat-melting material.

4. The method according to claim 1, further comprising heating the formable surface of the composite component prior to, during or both prior to and during re-profiling of the surface.

5. The method according to claim 1, further comprising cooling the re-profiled surface of the composite component during or after re-profiling of the surface.

6. The method according to claim 1, further comprising measuring the position of the forming tool.

7. The method according to claim 2, where the heat-setting material comprises more than 50% of a thermosetting polymer.

8. The method according to claim 3, where the heat-softening material comprises more than 50% of a thermoplastic polymer.

9. The method according to claim 1, where a release agent or other material is located between the forming tool and the re-profiled surface.

10. The method according to claim 1, where the surface is re-profiled to an accuracy of ±50 microns.

11. An apparatus for surface re-profiling of a region of a composite component to a predetermined local height with an accuracy of +/−200 microns, the region comprising a formable surface and having a thickness greater than a predetermined final thickness, the apparatus comprising:
   a supporting fixture to locate the composite component in a fixed position;
   a forming tool for contacting with and moving across the formable surface, the forming tool comprising a heating means to cause the formable surface in the path of the tool to flow as the forming tool progresses across the formable surface;
   an actuation system to position and move the forming tool; and
   a controller for controlling the actuation system in response to signals received from one or more location or measurement sensors to move and position the forming tool along a predetermined height profile or so as to leave the re-profiled component with a predetermined thickness profile, to form a re-profiled surface.

12. The apparatus according to claim 11, where the forming tool comprises shaped metal.

13. The apparatus according to claim 11, where the forming surface of the forming tool moves relative to the body of the forming tool.

14. The apparatus according to claim 13, where the forming surface of the forming tool is a roller or continuous foil.

15. The apparatus according to claim 11, where the forming tool includes an internal heater.

16. The apparatus according to claim 11, further comprising an external heater.

17. The apparatus according to claim 11, where the forming tool further comprises a cooling system to cool the re-profiled surface beneath or behind the forming tool.

18. The apparatus according to claim 11, where the forming tool is attached to an actuator.

19. The apparatus according to claim 11, where the measurement sensor is attached to or contained within the forming tool.

20. The apparatus according to claim 19, where the signal emanating from the sensor passes through the forming tool.

21. The apparatus according to claim 19, where the sensor performs an action selected from the group consisting of utilizing, generating, sensing and a combination of the preceding, of one or more than one of the following, laser light, ultrasonic signals, eddy currents and magnetic fields.

22. The apparatus according to claim 20, where the sensor performs an action selected from the group consisting of utilizing, generating, sensing and a combination of the preceding, of one or more than one of the following, laser light, ultrasonic signals, eddy currents and magnetic fields.

23. The apparatus according to claim 11, further comprising an actuation system to control the relative displacement of the forming tool with respect to a support fixture.

24. The apparatus according to claim 11, where the forming tool is attached to a robotic arm or gantry.

* * * * *